United States Patent [19]

Musgrove

[11] 4,070,001
[45] Jan. 24, 1978

[54] VACUUM SAFETY VALVE

[76] Inventor: Ronald R. Musgrove, 1914 Republic Ave., San Leandro, Calif. 94577

[21] Appl. No.: 702,527

[22] Filed: July 6, 1976

[51] Int. Cl.² ............................................. F16K 51/02
[52] U.S. Cl. ................................. 251/46; 137/DIG. 8
[58] Field of Search ............. 251/46, 33; 137/DIG. 8; 91/52

[56] References Cited
U.S. PATENT DOCUMENTS

| 2,524,951 | 10/1950 | Ashton | 251/DIG. 1 |
| 2,630,831 | 3/1953 | Arnold | 251/46 X |
| 3,493,008 | 2/1970 | Scaglione | 251/46 X |

Primary Examiner—Arnold Rosenthal
Attorney, Agent, or Firm—Harris Zimmerman

[57] ABSTRACT

A vacuum safety valve comprises a closed cylindrical valve body having one end connected to a system to be evacuated, and a tube extending from the side wall to a vacuum pumping system. The other end of the valve body includes a port connected to ambient air through a solenoid operated valve which is normally open when de-energized. An extendable bellows is secured about the port on the inside of the valve body, and the distal end of the bellows is sealed by a plate having a small bleed hole in the edge thereof. Should the pumping system fail, the solenoid valve is deactuated to open the bellows interior to ambient air. The air pressure expands the bellows and drives the plate against the interior port to seal off the system side of the valve before the vacuum therein is destroyed.

6 Claims, 2 Drawing Figures

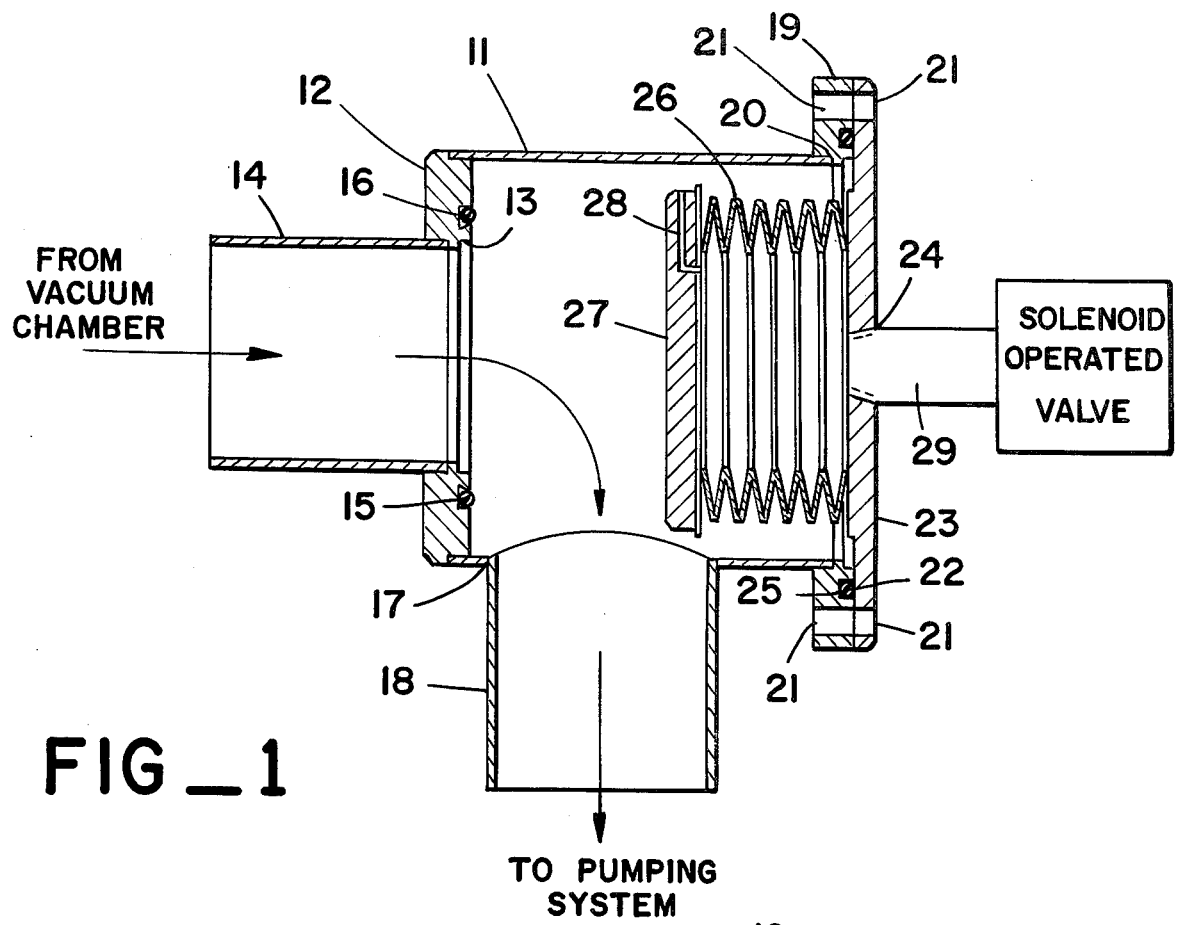
FIG_1
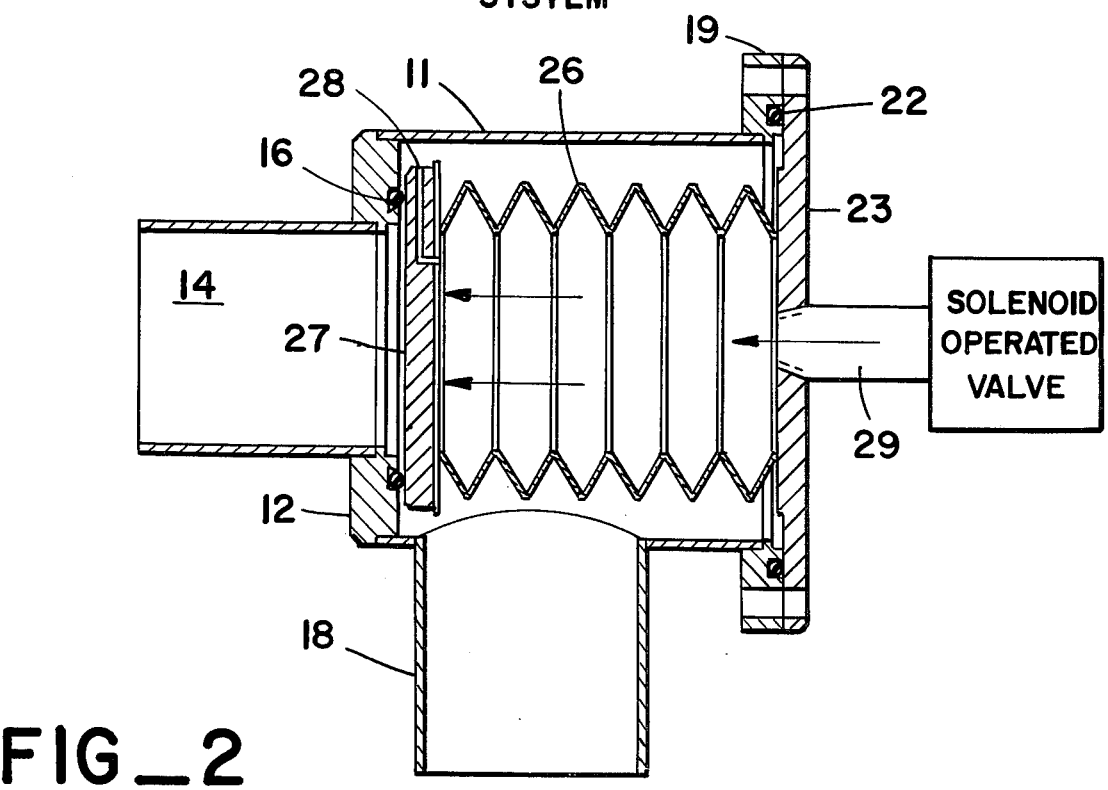
FIG_2

VACUUM SAFETY VALVE

BACKGROUND OF THE INVENTION

The following U.S. Pat. Nos. exemplify the state of the art of the safety control valves:

| | |
|---|---|
| 2,407,761 | 3,010,691 |
| 2,480,712 | 3,138,172 |
| 2,691,504 | 3,459,403 |

In these prior art devices the general concept is the use of a diaphragm or piston of various designs selectively interposed in the fluid flow for control purposes. The piston or diaphragm is operated either by a pressurized fluid or by a portion of the pressurized fluid being controlled by the valve itself. These devices suffer the common drawback of uncertainty in the supply of fluid under pressure which is required to operate the valve. Also, these prior art devices tend to act too slowly to protect a high vacuum from reentry of air or contamination by oil from the vacuum pump.

SUMMARY OF THE INVENTION

The present invention generally comprises a vacuum safety valve which employs ambient air pressure to close the valve and protect the vacuum in the event of pump or system failure. It includes a closed cylindrical valve body having a port at one end connected to the system to be evacuated, and a port extending from the side wall thereof to a vacuum pumping system. An accordion-type extendable bellows is secured to the interior wall of the other end of the valve body, the distal end of the bellows being sealed by a cylindrical plate. The plate is provided with a bleed hole extending from the bellows interior through the edge of the plate to the interior of the valve body.

The other end of the valve body is also provided with a valve port providing open flow communication between the bellows interior and a solenoid operated valve. The other end of the solenoid operated valve communicates with ambient air, and the valve is normally open.

In operation the solenoid operated valve is actuated to close communication with ambient air, and the vacuum pumping system evacuates the valve body and the system connected thereto. The air within the bellows is also evacuated through the bleed hole. The bellows thus is established in the retracted position. If the vacuum pumping system should fail or other system malfunctions occur, sensors will respond by releasing the solenoid operated valve to open to ambient air. The air will rush into the bellows cavity, and the differential pressure will cause the bellows to rapidly expand. The bellows plate will close the port to the system and protect it from gas infiltration or oil contamination. When evacuation is resumed, the solenoid operated valve is actuated to close, and the system port will not reopen until the pressure within the valve is equal to or less than that of the system. Thus the valve also prevents contamination of the system.

THE DRAWING

FIG. 1 is a cross-sectional view of the valve of the present invention, shown in the open position.

FIG. 2 is a cross-sectional view of the valve of the present invention, shown in the closed position.

DESCRIPTION OF THE PREFERRED EMBODIMENT

With reference to FIG. 1, the vacuum safety valve of the present invention generally includes a cylindrical member 11, and a plate 12 secured to and sealing one end thereof by welding or similar means. The plate is provided with a centrally disposed port 13 therein, in which a tube or pipe 14 is secured. The tube 14 leads to a chamber or the like which is to be evacuated. Disposed about the port 13 is an O-ring groove 15 in which an O-ring 16 is obtained.

The cylindrical member 11 is provided with a hole 17 therein, and a tube 18 is joined therein in sealing fashion. The tube 18 extends to a vacuum pumping system, so that the vacuum pump draws gases from the vacuum chamber through the tube 14 and the cylindrical member 11, out the tube 18 and to the vacuum pumping system, as shown by the arrows in FIG. 1.

A ring member 19 is secured to the other end 20 of the cylindrical member by welding or the like. The ring member is provided with an O-ring groove 25 disposed about the end 20 of the cylindrical member, in which an O-ring 22 is retained. The ring member is also provided with a plurality of bolt holes 21 spaced equally about the circumference thereof.

Joined to the ring member 19 and sealing the end 20 of the cylindrical member is a circular plate 23. The plate 23 is provided with similarly spaced bolt holes 21 for bolts joining it to the ring member, and the plate impinges on the O-ring 22 to form the sealing engagement. Centrally disposed in the plate 23 is a tapered, threaded hole 24. A threaded pipe 29 is secured in the hole 24 and extends to a solenoid operated valve which, when open, connects the pipe 29 directly to ambient air.

The present invention also includes an extendable bellows 26 of metal or the like secured at one end to the interior surface of the plate 23, and secured about the hole 24 so that the pipe 29 communicates directly with the interior cavity of the bellows. Joined to the other end of the bellows in sealing fashion is a circular plate 27, which is greater in diameter than the O-ring 16. The plate 27 is provided with a bleed hole 28 which extends from the peripheral edge thereof to the interior surface thereof, thereby connecting the interior bellows cavity with the interior valve cavity.

With no unbalanced pressure impinging upon the bellows it is disposed in the state depicted in FIG. 1; i.e., retracted out of engagement with the O-ring 16 and substantially clear of the hole 17. In this disposition, with the solenoid valve actuated and closed, the vacuum pumping system may draw gases from the vacuum chamber through the tube 14 and out the pipe 18. Also, the vacuum pumping system evacuates the interior of the bellows and the pipe 29 through the bleed hole 28. The bleed hole thus prevents any pressure differential across the bellows, so that the bellows remains retracted.

Should any malfunction occur, it is important to protect the vacuum which is already established within the vacuum chamber, to prevent wasting the time and considerable energy required to create the vacuum and to eliminate oil migration from the pump which is at ambient air pressure. These malfunctions, such as vacuum pump shutdown, leaks, or the like are monitored by sensors which respond by releasing the solenoid operated valve. Air at ambient pressure is thus introduced to the bellow interior through the pipe 29. The unbalanced air pressure forces the bellows to expand rapidly, the plate 27 impinging on the O-ring 16 and sealing off the vacuum chamber through tube 14, as shown in FIG. 2.

It should be noted that after the bellows expands the air therein will gradually enter the valve body through the bleed hole 28. However, the disposition of the bleed hole at the periphery of the plate 27, outside of the O-ring seal 16, does not allow air to enter the tube 14. Also, during the short period that the bellows is expanding to seal the tube 14, the rapid action of the bellows, together with the rather constricted diameter of the bleed hole, (approximately 0.050 in, 0.13 cm) permits very little air to migrate into the vacuum chamber through the tube 14. Thus the vacuum safety valve of the present invention maintains the established vacuum virtually intact while any malfunction is investigated and repaired.

With the vacuum safety valve in the sealed position vacuum pumping may be resumed by first closing the solenoid actuated valve. The pumping system is then activated to remove gases from the valve body 11, and the bellows interior. As the pressures in the tube 14 and within the bellows equalize, the bellows will retract to permit free flow through the tube 14. Due to the fact that the valve will not open until the pressure is equalized, no gases are introduced to the vacuum chamber to degrade the vacuum therein.

I claim:

1. A vacuum safety valve, comprising a valve body having an inlet port and an outlet port, valve seating means disposed about said inlet port on the interior of said valve body, extendable bellows secured within said valve body and including means for engaging said seating means and sealing said inlet port when said bellows means is fully extended; said valve body including a bellows port communicating with the interior of said extendable bellows and with a valve means which selectively opens to ambient air, said means for engaging said seating means including a plate secured in sealing fashion to the distal free end of said bellows, and further including a bleed port extending from said interior of said bellows through said plate to the peripheral edge thereof, said bleed port extending in constant, limited flow communication between said interior of said valve body and said interior of said bellows.

2. The safety valve of claim 1, wherein said seating means includes an O-ring seal disposed about said inlet port.

3. The safety valve of claim 1, wherein said valve body comprises a cylinder having said inlet port at one end thereof, and said extendable bellows is secured to the interior surface of the other end thereof.

4. The safety valve of claim 3, wherein said bellows port is disposed in said other end of said cylinder.

5. The safety valve of claim 4, wherein said outlet port is disposed in the wall of said cylinder.

6. The safety valve of claim 1, wherein said valve means is closed when actuated, and said extendable bellows is extended only by positive pressure therein introduced through said valve means when deactuated and open.

* * * * *